Jan. 21, 1930.                M. TIBBETTS                1,744,179
                              MOTOR VEHICLE
                          Filed May 4, 1926        2 Sheets-Sheet 1
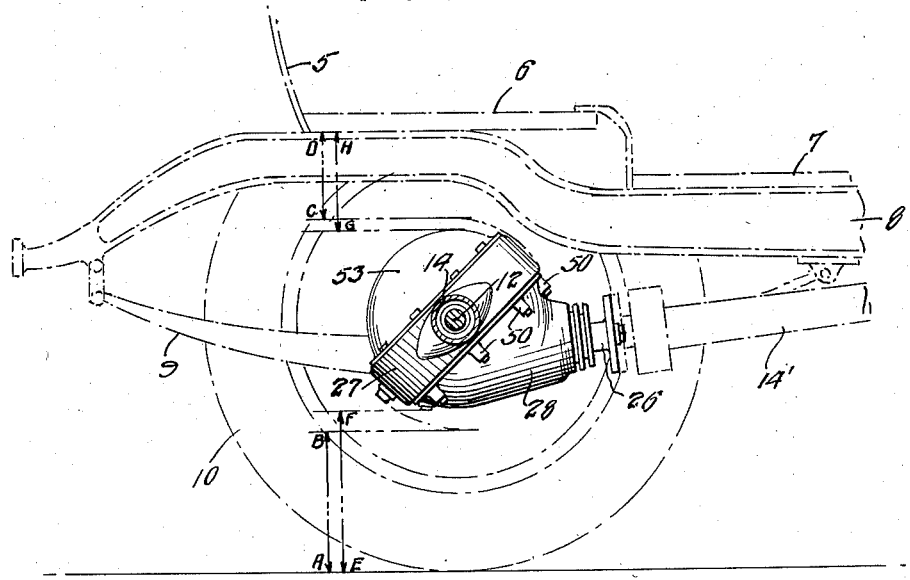
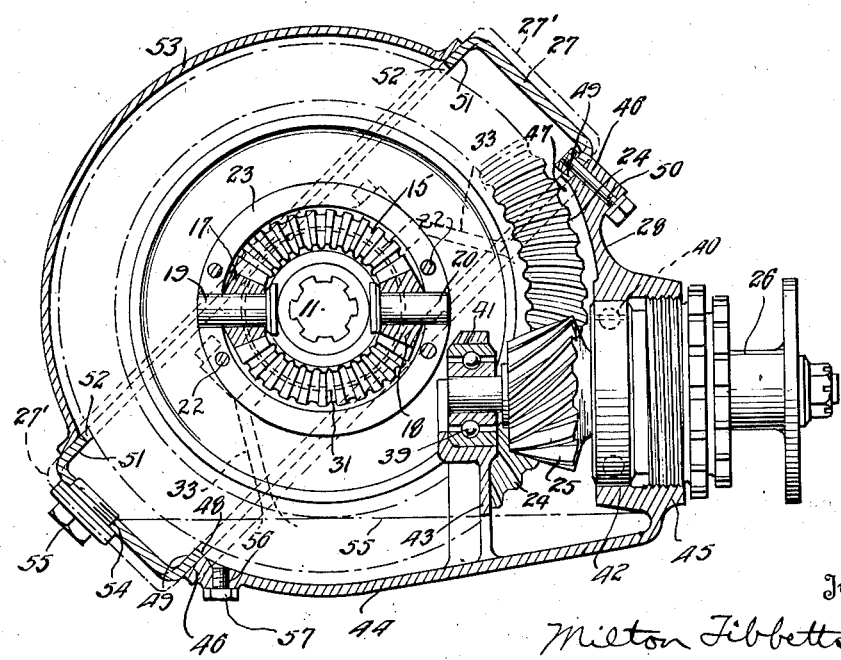
Inventor
Milton Tibbetts
By Mauro, Cameron, Lewis & Kerkam
Attorneys Jan. 21, 1930.  M. TIBBETTS  1,744,179
MOTOR VEHICLE
Filed May 4, 1926  2 Sheets-Sheet 2

Inventor
Milton Tibbetts
By Mauro, Cameron, Lewis & Kerkam
Attorneys

Patented Jan. 21, 1930

1,744,179

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed May 4, 1926. Serial No. 106,745.

This invention relates to motor vehicles, and more particularly to the driving axles and gearing for driving the same.

It has heretofore been proposed to provide a driving axle with a differential mechanism driven by a pair of intermeshing bevel gears having angularly related axes disposed in the same plane, and to enclose said differential mechanism and gears in a vertically disposed flattened housing on the axle and a hollow carrier secured on the front of the housing and having bearings for the differential mechanism and driving gears. Constructions such as these, however, have certain disadvantages in that the vertical disposition of the housing limits the road and body clearances thereof, necessitates disconnection of the carrier from the propeller shaft in order to remove the former from the housing, and requires draining of the lubricant from the housing prior to removal of the inspection cover therefrom.

The principal objects of this invention are to provide an axle construction which eliminates the disadvantages above referred to; which, by the employment of a pair of intermeshing bevel driving gears having their axes offset from each other, enables the enlarged housing on the axle casing to be inclined to the vertical plane of the axle, thus affording increased road and body clearances for said housing; which, by the direction of inclination of the enlarged housing, enables the hollow carrier associated therewith to be detached and dropped downwardly without disconnecting the propeller shaft of the vehicle from the pinion shaft on the carrier; which insures the maintenance of a predetermined level of the lubricant in the housing and carrier and at the same time enables the inspection cover to be removed without draining said lubricant; which, by the position of the housing, enables the depth thereof to be increased to afford additional strength for the axle while at the same time not affecting the increased road and body clearances of the housing; and which is an inexpensive, efficient and expeditious construction for the driving axles of motor vehicles or the like.

In order to more clearly understand this invention, reference may be had to the accompanying drawings which illustrate one embodiment of the inventive idea, and wherein—

Fig. 1 is a side elevation of one embodiment of the invention installed on a motor vehicle, a portion of which is indicated in dotted lines;

Fig. 2 is a vertical sectional view on the line 2—2 of Fig. 3, showing the inspection cover positioned on the inclined housing;

Figure 3:
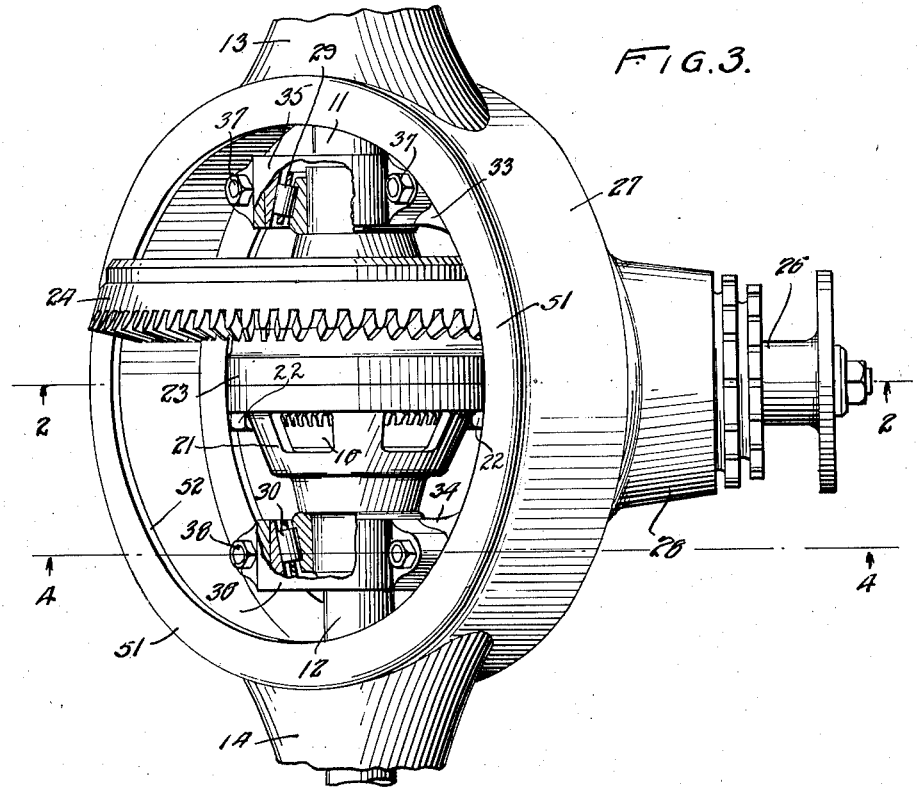
Fig. 3 is an enlarged top plan view of the construction shown in full lines in Fig. 1, with the inspection cover removed for purposes of clearer illustration.
Figure 4:
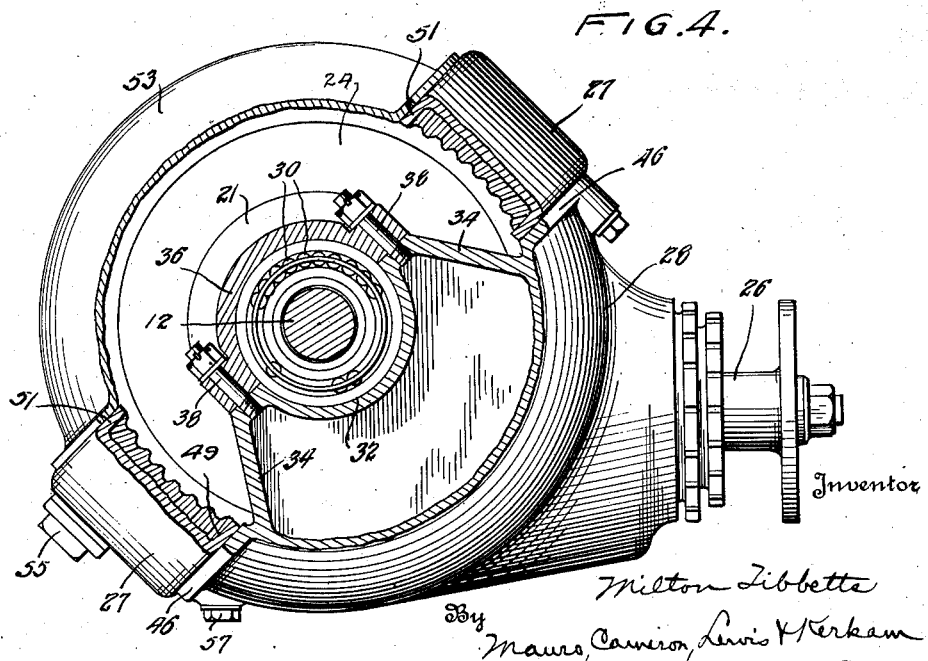
Fig. 4 is a vertical sectional view on the line 4—4 of Fig. 3.

Referring to the drawings, wherein like reference numerals designate like parts throughout the several views, 5 indicates the body of a motor vehicle, 6 the rear seat support, 7 the floor-board, 8 the chassis, 9 one of the rear springs, and 10 one of the rear wheels. The rear wheels are mounted in the usual way on the outer ends of axle shafts 11 and 12 which extend through tubular sections 13 and 14 of the axle casing and are connected at their inner ends with the usual differential mechanism driven by gearing from the propeller shaft 14' of the motor vehicle. The differential mechanism preferably includes bevel gears 15 and 16 splined on the opposed inner ends of the axle shafts 11 and 12 and meshing with differential pinions 17 and 18 fixed on the arms 19 and 20 of the usual differential spider. The differential mechanism is disposed in the usual two-part differential housing, one part 21 of which surrounds the gear 16 and is bolted or otherwise suitably secured at 22, 22, to the other part 23 of said differential housing. The differential housing is provided with suitable openings in the wall thereof into which the arms 19 and 20 of the differential spider project, and the part 23 of said differential housing is preferably in the form of an annular flange or casing fixed on a part of the driving gearing.

In accordance with the present invention, the driving gearing comprises a pair of intermeshing skew bevel gears the axes of which are offset with respect to each other, and said gears preferably consist of a large skew or spiral bevel gear 24 on which the differential housing part 23 is fixed, and a small skew or spiral bevel pinion 25 meshing with the gear 24 and serving to drive the latter. The pinion 25 is fixed on a driving shaft 26 extending at right angles to the axle in offset relation therewith and connected with the propeller shaft 14' of the vehicle. The differential mechanism and driving gearing above described are enclosed in an enlarged flattened housing 27 on the axle casing and a hollow carrier 28 detachably secured on the front of said housing and having bearings for the differential mechanism and said driving gearing. The disposition of the gears 24 and 25 with their axes in offset relation, enables the employment of an inclined housing for the differential mechanism and driving gearing and, in accordance with the present invention, the housing 27 is inclined to the vertical plane of the axle about the axis thereof, thus providing increased road and body clearances for said housing. The inclination of the housing 27 to the vertical plane of the axle may vary in certain instances, but as herein shown, the housing is preferably set at an angle of approximately 45° and inclined rearwardly and downwardly with respect to the vehicle. The increased clearances afforded by inclining the housing 27, are clearly illustrated in Fig. 1 wherein the road and body clearances with a vertically disposed enlarged flattened housing are indicated by the arrows A B and C D respectively, and the road and body clearances with the housing inclined as shown are indicated by the arrows E F and G H, respectively, and are greater than the clearances designated by the arrows A B and C D. It will be observed that the depth of the housing 27 may be increased as indicated by dotted line 27' in Fig. 2, without affecting the increased clearances designated by the arrows E F and G H, this increase in the depth of the housing increasing the truss effect thereof, and at the same time avoiding the use of notches in the front and rear sides of the housing for removal of the large driving gear 24 therefrom.

In accordance with the preferred embodiment of the present invention, the differential mechanism and driving gears are carried in bearings on the hollow carrier 28, and said carrier is constructed so that, on removal of the large driving gear and the differential mechanism from the rear of the housing 27, the carrier 28 and parts mounted thereon can be disconnected from the housing 27 and dropped downwardly therefrom without disconnecting the shaft 26 from the propeller shaft 14' and without interference or forward movement of the carrier and parts thereon with respect to the housing 27. For this purpose, the housing and the hollow carrier are provided with connecting portions inclined downwardly and rearwardly with respect to the vehicle and the bearings 29 and 30 for the differential mechanism and the large gear 24 are mounted in semicircular seats 31 and 32 formed in webs 33 and 34, each extending from the carrier 28 into the housing 27 at an angle providing for relative vertical movement between the housing and the carrier without interference between the webs 33 and 34 and the housing. The bearings 29 and 30 are retained in the seats 31 and 32 by semicircular blocks 35 and 36 which are disposed over said bearings and bolted or otherwise suitably secured at 37 and 38, respectively, to the webs 33 and 34. The bearings 39 and 40 for the driving shaft 26 are carried in circular seats 41 and 42 formed in a web 43 extending from the bottom 44 of the carrier and a boss 45 disposed at the front of said carrier. The downwardly and rearwardly inclined end or connecting portion 46 of the carrier 28 has an opening 47 therein which registers with an opening 48 formed in the downwardly and rearwardly inclined front side or connection portion 49 of the housing 27, and the webs 33 and 34, as clearly shown in the drawings, extend through said registering openings into the housing 27. The inclined open end 46 of the carrier is detachably connected with the inclined side 47 of the housing over the opening therein, as by bolts or other suitable fastening devices indicated at 50, 50. The housing 27 is provided with a rear side 51 inclined rearwardly and downwardly and having an opening 52 therein through which the differential mechanism and the large bevel gear 24 may be moved into and out of the housing 27. It will thus appear, that with the gear 24 and the bolts 50, 50 removed from the housing, the carrier may be dropped downwardly without disconnecting the pinion shaft 26 from the propeller shaft 14' of the vehicle and without any forward movement of said carrier to clear the webs 33 and 34 with respect to the housing.

The opening 52 in the rear inclined side 51 of the housing 27 is preferably closed by an inspection cover 53 which is bolted or otherwise detachably secured on the housing over the opening 52 and, in accordance with the present invention, the filling opening 54, for supplying lubricant to the gearing in the housing 27 and carrier 28, is located in said housing below the cover 53 so that the latter can be removed without draining the lubricant in the housing and carrier. The opening 54 has removably fitted therein a filling plug 55, and said opening and plug are disposed above the bottom 44 of the carrier so that a predetermined level of the lubricant in the housing and carrier may be maintained as indicated, for example, by the horizontal dotted line 55' in Fig. 2. A drain opening 56 is preferably located in the bottom 44 of the carrier and has removably fitted therein a drain plug 57 of the usual or any well known construction.

It will appear from the foregoing that, in addition to the increased road and body clearances afforded by the inclination of the enlarged housing on the axle to the vertical plane thereof, the direction of inclination of said housing as herein shown enables the hollow carrier to be dropped downwardly after removal of the differential mechanism and driven gear, without disconnecting the carrier and driving pinion shaft from the propeller shaft of the vehicle. It will further appear, that by the present invention, the inspection cover may be removed from the housing without draining the lubricant from the latter and the hollow carrier, and that by reason of the position of the enlarged housing on the axle, the depth of said housing may be increased to provide additional strength for the axle, while at the same time not affecting the increased road and body clearances of the housing afforded by inclining the same. In addition to the foregoing advantages, the present invention may be embodied in a construction which is highly efficient in operation, which has a small number of parts, and which is inexpensive in its manufacture and installation.

What is claimed is:—

1. In a motor vehicle, a housing and a carrier having abutting connected portions inclined downwardly and rearwardly with respect to the vehicle, a driving axle projecting in the housing, a driven gear extending in the housing and the carrier and connected with the driving axle, and a driving gear meshing with said driven gear and mounted on the carrier forwardly of said axle.

2. In a motor vehicle, a housing and a carrier detachably mounted together and having abutting portions inclined downwardly and rearwardly with respect to the vehicle, a driving axle projecting in the housing, and axle driving gearing over which the housing extends and comprising a driven gear connected with the axle and a driving gear meshing with the driven gear and journaled on the carrier forwardly of said driving axle.

3. In a motor vehicle, a housing and a carrier having abutting portions inclined downwardly and rearwardly with respect to the vehicle, means detachably connecting said parts together, a driving axle projecting in the housing, and axle driving gearing having bearings on the carrier and comprising a driven bevel gear connected with the axle and a driven bevel pinion meshing with the driven bevel gear and journaled on the carrier forwardly of and below said axle.

4. In a motor vehicle, a housing and a carrier having abutting portions inclined downwardly and rearwardly with respect to the vehicle, means detachably connecting the carrier with the housing, a driving axle projecting in the housing, and a pair of intermeshing skew bevel gears having offset axes, one of said gears being connected with the axle in said housing and the other gear being journaled on the carrier forwardly of said driving axle.

5. In a motor vehicle, a housing and a carrier detachably connected together and having abutting portions inclined downwardly and rearwardly with respect to the vehicle, a driving axle projecting in the housing, a differential mechanism in the housing, connected with said axle and carrying a driven bevel gear, a driving shaft element journaled on the carrier forwardly of the driving axle in offset relation with and at right angles thereto, and a bevel driving pinion fixed on said shaft element and meshing with said driven bevel gear.

6. In a motor vehicle, a housing and a carrier having connecting portions inclined downwardly and rearwardly with respect to the vehicle, a driving axle extending into the housing, a differential mechanism in the housing and connected with the driving axle, said differential mechanism having bearings on the carrier and a driven bevel gear, a driving shaft journaled on the carrier below and forwardly of the driving axle and extending at right angles thereto, and a bevel driving pinion on the driving shaft and meshing with said driven bevel gear.

7. In a motor vehicle, a housing and a hollow carrier having connecting portions inclined downwardly and rearwardly with respect to the vehicle, a driving axle extending into the housing, gearing in the housing and hollow carrier for driving the axle, a cover mounted on the rear of the housing over an opening in a downwardly and rearwardly inclined face thereof, and a filling plug removably secured in an opening formed in the housing below the edge of said cover.

8. In a motor vehicle, a housing inclined downwardly and rearwardly with respect to the vehicle and having an opening extending through the housing from the front to the rear thereof, a hollow carrier having an inclined open end fitted on the forward inclined side of the housing over the opening therein, an axle extending into the housing, driving gearing for the axle and disposed within the housing and hollow carrier, a cover mounted on the rear inclined side of the housing over said opening, and a filling plug removably secured in an opening formed in the housing below the lower edge of said cover.

9. In a motor vehicle, an enlarged housing inclined downwardly and rearwardly with respect to the vehicle and having an opening extending through said housing from the front to the rear thereof, a hollow carrier having an open end portion inclined downwardly and rearwardly and secured on the forward inclined side of the housing over the opening therein, a driving axle extending into the housing, gearing arranged in the housing and hollow carrier for driving said axle and comprising a pair of intermeshing bevel gears having offset axes, an inspection cover detachably mounted on the rear inclined side of the housing over said opening, and a filling plug removably secured in an opening formed in the housing below said cover.

10. In a motor vehicle, a driving axle, a casing therefor having an enlarged housing inclined downwardly and rearwardly with respect to the vehicle and an opening extending through said housing from the front to the rear thereof, a hollow carrier having an open end portion inclined downwardly and rearwardly and secured on the forward inclined side of the housing over the opening therein, gearing arranged in the housing and hollow carrier for driving said axle, a drain plug removably fitted in an opening formed in the bottom wall of said carrier, a cover mounted on the rear inclined side of the housing over the opening therein, and a filling plug removably secured in an opening formed in the wall of the housing below said cover and above said drain plug.

11. In a motor vehicle, a driving axle on which a pair of the vehicle wheels are mounted, an axle casing having an enlarged housing inclined about the axis of said wheels and provided with a front opening and a rear opening, a carrier having an inclined rear end secured on the forward inclined side of said housing over its front opening, a driving shaft journaled on said carrier in offset relation with the axle and extending at right angles thereto, gearing extending in the inclined housing and comprising a skew bevel driven gear mounted on said axle and a skew bevel driving pinion meshing with said driven gear and mounted on said driving shaft, and a cover mounted on the inclined housing over its rear opening and said driven gear.

12. In a motor vehicle, a driving axle on which a pair of the vehicle wheels are mounted, an axle casing having an enlarged flat substantially annular housing inclined about the axis of said wheels and provided with a front opening and a rear opening, a carrier having an inclined rear end portion secured on the forward inclined side of said housing over its front opening, a driving shaft journaled on said carrier below the axle and extending at right angles thereto, gearing extending in the inclined housing and comprising a skew bevel driven gear mounted on said axle at one side of the driving shaft and a skew bevel driving gear meshing with said gear and mounted on said driving shaft, and a cover mounted on the inclined housing over its rear opening and said driven gear.

13. In a motor vehicle, a driving axle on which a pair of the vehicle wheels are mounted, a housing into which said axle extends and having a forward portion inclined about the axis of said wheels and provided with an opening, a carrier having an inclined rear end portion secured on the forward inclined portion of said housing over the opening therein, a driving shaft journaled on the carrier in offset relation with the axle and extending at right angles thereto, a skew bevel driven gear mounted on the axle and extending in said housing, and a skew bevel driving pinion meshing with said driven gear and mounted on said driving shaft.

14. In a motor vehicle, a driving axle on which a pair of the vehicle wheels are mounted, an enlarged housing into which the axle extends and having a forward portion inclined about the axis of said wheels and provided with an opening, a hollow carrier having an inclined open rear end fitted on the forward inclined portion of said housing over the opening therein, a skew bevel driven gear mounted on the axle in said housing and extending through the front opening thereof, a driving shaft journaled on the hollow carrier in offset relation with the axle and extending at right angles thereto, and a skew bevel driving pinion meshing with said driven gear and mounted on said driving shaft within said hollow carrier.

15. In a motor vehicle, a driving axle on which a pair of the vehicle wheels are mounted, an enlarged housing into which said axle extends and having a forward open portion inclined about the axis of said wheels, a differential mechanism in said housing and connected with the axle, a carrier having an inclined rear end portion fitted on the forward open inclined portion of the housing and bearings for said differential mechanism, a driving shaft journaled on the carrier in offset relation with the axle and extending at right angles thereto, a driven bevel gear carried by the differential mechanism and over which the housing extends, and a bevel driving gear carried by the driving shaft and meshing with said driven bevel gear.

16. In a motor vehicle, a driving axle on which a pair of the vehicle wheels are mounted, an axle casing having an enlarged housing inclined about the axis of said wheels and provided with front and rear inclined sides each having an opening therein, a carrier having an inclined rear end portion fitted on the forward inclined side of the housing over the opening therein, axle driving gearing extending in the housing and including a pair of intermeshing gears having offset axes extending at right angles to each other, and a cover mounted on the rear inclined side of the housing over the opening therein.

17. In a motor vehicle, a driving axle on which a pair of the vehicle wheels are mounted, an axle casing having an enlarged housing inclined about the axis of said wheels and provided with a front opening and a rear opening, a carrier having an inclined rear end portion secured on the front inclined side of the housing over the front opening therein, axle driving gearing extending in said housing and comprising a driven bevel gear and a bevel driving pinion having offset axes and bearings on said carrier, and a cover mounted on the rear inclined side of the housing over the rear opening therein.

18. In a motor vehicle, a driving axle on which a pair of the vehicle wheels are mounted, an axle casing having an enlarged housing inclined downwardly and rearwardly with respect to the vehicle and provided with a front opening and a rear opening, a carrier having an inclined rear end portion fitted on the forward inclined side of said housing over the front opening therein, axle driving gearing over which the housing extends and comprising a skew bevel driven gear and a skew bevel driving pinion intermeshing and having offset axes, and a cover mounted on the rear inclined side of the housing over the rear opening therein.

19. In a motor vehicle, a driving axle, a casing therefor having an enlarged housing the forward side of which is inclined rearwardly and downwardly with respect to the vehicle and provided with an opening, axle driving gearing over which the housing extends and including a skew bevel driven gear and a skew bevel driving pinion intermeshing and having offset axes, and a carrier having an inclined portion secured to the forward inclined side of the housing over said opening and bearings for said gear and pinion.

20. In a motor vehicle, a driving axle, an enlarged housing provided with a forward open side inclined to the vertical plane of the axle, a carrier having an inclined end fitted on the forward inclined side of the housing over the opening therein, differential mechanism in the housing connected with the axle and carried in bearings on the carrier which extend into the housing, a driving shaft journaled on the carrier below said axle and at right angles thereto, and driving gearing comprising a driven bevel gear carried by the differental mechanism and a bevel pinion fixed on the driving shaft and meshing with said driven bevel gear.

21. In a motor vehicle, a casing for the driving axle thereof and provided with an enlarged housing having an open forward side inclined downwardly and rearwardly with respect to the vehicle, a carrier having a downwardly and rearwardly extending inclined portion secured on the forward inclined side of the housing over the opening therein, differential mechanism in the housing connected with said axle and journaled in bearings which extend into the housing from said carrier, a driven bevel gear fixed on the differential mechanism, a driving shaft journaled on the carrier below the axle and extending at right angles thereto, and a bevel driving pinion fixed on the driving shaft and meshing with said driven bevel gear.

22. In a motor vehicle, a driving axle, a driven gear connected therewith, a housing extending over the driven gear and inclined downwardly and rearwardly with respect to the vehicle, a carrier secured on the front inclined side of the housing over an opening therein through which the driven gear projects, and a driving gear meshing with the driven gear and journaled on said carrier forwardly of the driving axle.

23. In a motor vehicle, a driving axle, a driven gear connected therewith, a housing extending over the driven gear, having open front and rear portions inclined downwardly and rearwardly with respect to the vehicle and through which said driven gear projects, a carrier and a cover secured on said front and rear portions respectively and extending over the driven gear, and a driving gear meshing with the driven gear and journaled on the carrier forwardly of said axle.

24. In a motor vehicle, a driving axle on which a pair of the vehicle wheels are mounted, a driven gear connected with said axle, a housing extending over said gear and having open front and rear portions inclined about the axis of said wheels and through which the driven gear projects, a carrier and a cover secured on the open front and rear inclined portions of the housing respectively and extending over the driven gear, and a driving gear meshing with the driven gear and arranged forwardly of the driving axle on said carrier.

25. In a motor vehicle, a driving axle on which a pair of the vehicle wheels are mounted, a driven gear connected with said axle, a housing for said gear inclined about the axis of said wheels to provide additional road and body clearances for said housing, a carrier secured on the front inclined side of the housing over an opening therein through which the driven gear projects, and a driving gear meshing with the driven gear and arranged on said carrier forwardly of the driving axle in offset relation therewith.

In testimony whereof I have signed this specification.

MILTON TIBBETTS.